United States Patent [19]
Edwards

[11] 3,936,807
[45] Feb. 3, 1976

[54] SENSOR BASED COMPUTER TERMINAL

[75] Inventor: Raymond A. Edwards, New York, N.Y.

[73] Assignee: Michigan Avenue National Bank of Chicago, Chicago, Ill.

[22] Filed: Apr. 12, 1974

[21] Appl. No.: 460,461

[52] U.S. Cl............ 340/172.5; 179/15 R; 340/150; 340/183
[51] Int. Cl.². G06F 3/02; G06F 3/04; G08C 15/12; H04J 3/12
[58] Field of Search...................... 179/15 BA, 15 R; 340/147 CN, 150, 172.5, 183

[56] References Cited
UNITED STATES PATENTS

| | | | |
|---|---|---|---|
| 3,688,271 | 8/1972 | Rouse | 340/172.5 |
| 3,786,423 | 1/1974 | Martell | 340/183 X |

Primary Examiner—R. Stephen Dildine, Jr.
Attorney, Agent, or Firm—Wolfe, Hubbard, Leydig, Voit & Osann, Ltd.

[57] ABSTRACT

A terminal at a data acquisition site and a terminal adapter at a computer site for efficiently acquiring, formatting, and communicating data to a computer for processing, for controlling the computer, and for receiving and responding to processed or responsive data from the computer. The terminal includes a plurality of input channels for receiving data (both acquired data and control signals), and a plurality of output channels for responding to processed data, each of such channels being assigned a unique digital address. Communication between the terminal and the terminal adapter is accomplished in a serial fashion, utilizing compound digital words including both data and address. Means are provided at both the terminal and terminal adapter for routing data within a received compound word to its addressed location.

13 Claims, 6 Drawing Figures

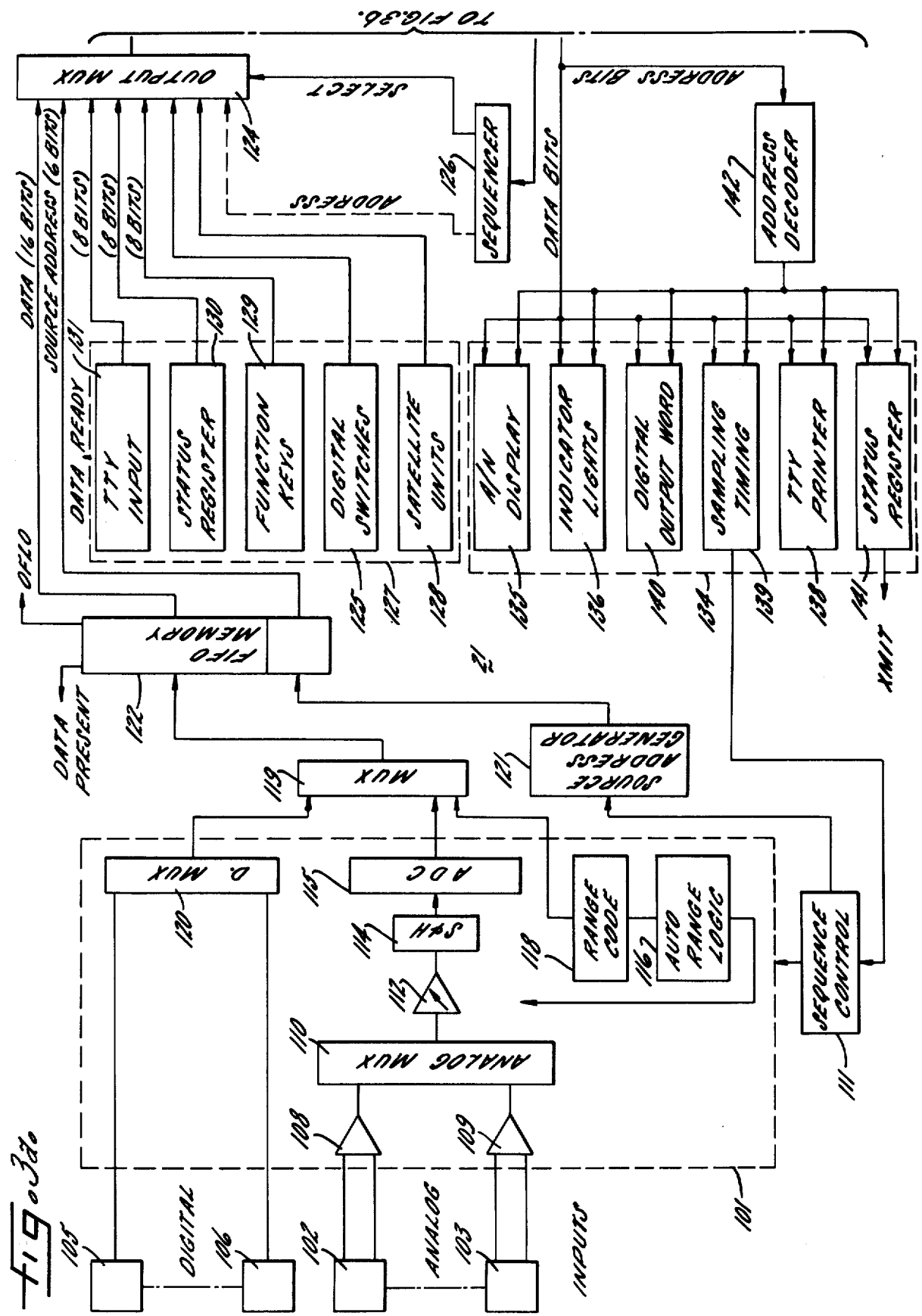

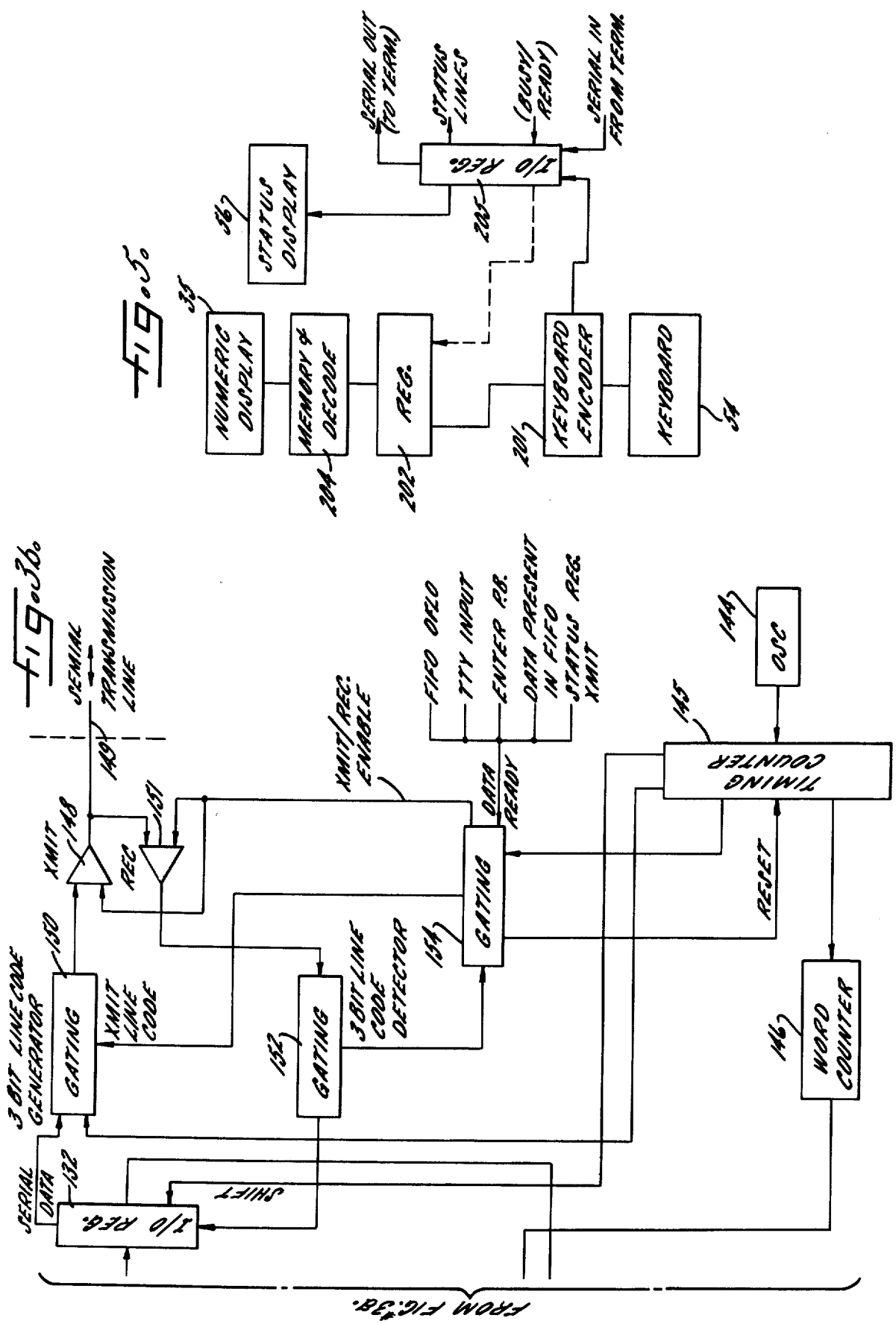

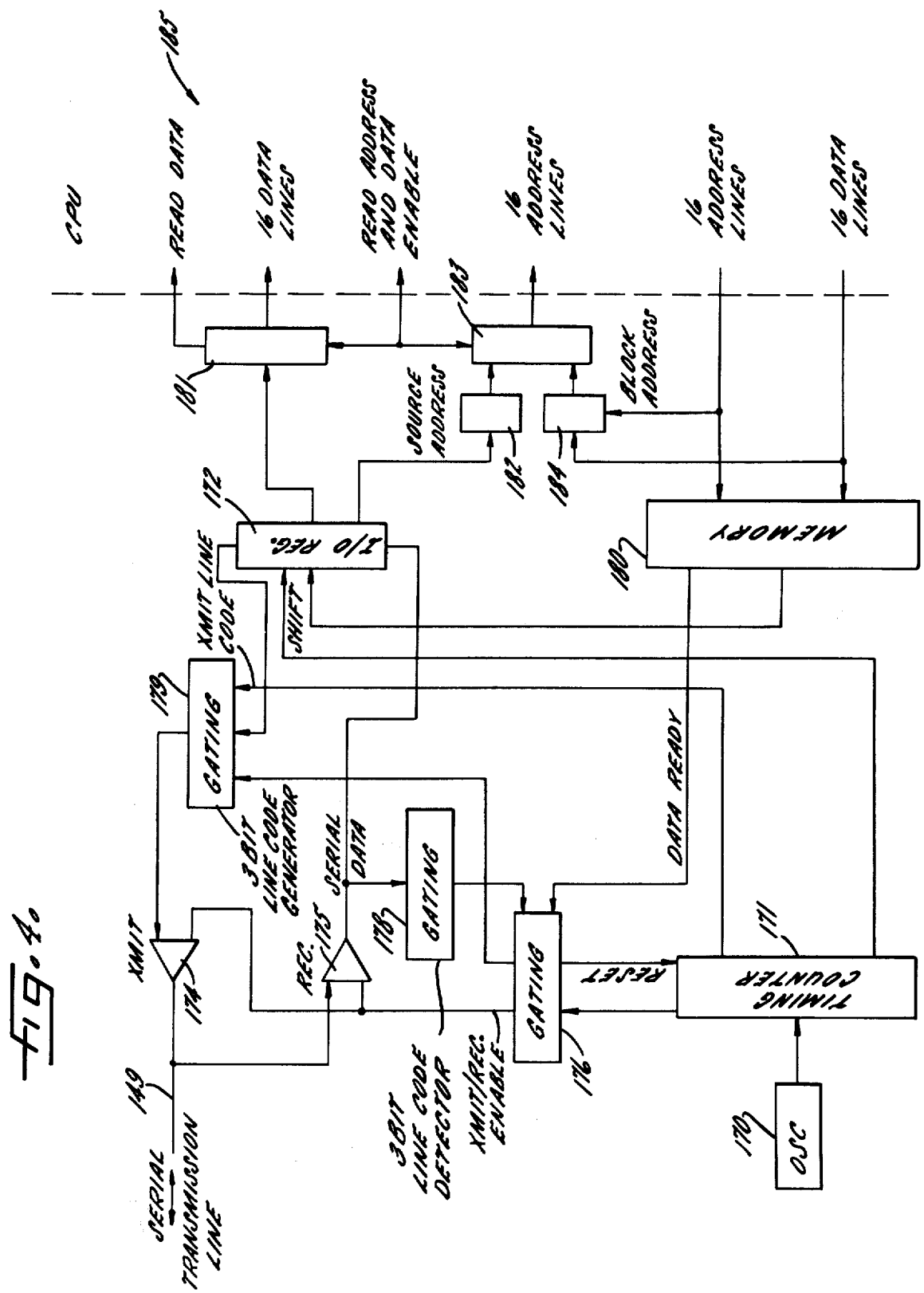

SENSOR BASED COMPUTER TERMINAL

The present invention relates to terminals for use with remote computers, and more specifically to those particularly adapted for use in data acquisition systems.

The prior art includes various forms of computer controlled data acquisition systems, including both those having on site or dedicated computers, and those utilizing remote computers. While systems using on site computers are desirable from a functional standpoint, such systems are not widely adopted because of their complexity and cost, in many cases being custom designed for a particular application. Expense is further increased by the necessary purchase or lease of the dedicated computer.

With the increasing availability of relatively inexpensive computer time leasing, it has become attractive in certain situations, to utilize a remote computer in a data acquisition system. Such a concept makes computerized data acquisition available to an ever increasing number of users. However, the capabilities of the available terminals are somewhat limited, especially in comparison with the on site computer systems. For example, many of the available terminals utilize the common serial ASCII transmission techniques, thereby affording compatibility with most remote computer systems. As a result, however, data transfer to and from the computer is somewhat cumbersome, in that each symbol transferred (whether it be address or data) requires a separate ASCII word. For example, if it were desired to transmit the results of a measurement including a four digit number with decimal point and sign, along with a three digit address, nine complete ASCII words would be required. The amount of serializing, deserializing, temporary storing, etc. which must be accomplished before a logical operation may be performed on the data is easily appreciated. Accordingly, a significant amount of computer time is devoted to transmission supervision and line control.

When a terminal having the characteristics described above is utilized in a data acquisition or sensor based application, the system limitations become apparent. The rate at which data may be collected is severely limited in that each digit must be individually encoded and serialized for transmission. Additionally, many of the ASCII terminals have only limited ability to alter the program (e.g. to bring an additional instrument on line), or enter other than sensor data (e.g. housekeeping data) without exiting from the data acquisition mode. The transmission limitations noted above further impose a limitation on the number and kind of input and output devices which may be incorporated into the system.

With the foregoing in mind, it is a general aim of the present invention to provide a sensor based computer terminal having a different operational mode than those known heretofore, in which bidirectional data transfer is expeditiously accomplished using compound digital words serially transmitted over a single transmission pair. In this regard, it is an object of the invention to provide a terminal and a terminal adapter, coupled by an available transmission means, which may effectively communicate data between a data acquisition site and a computer site, and requiring a minimum amount of computer time to supervise the communication.

It is a general object of the invention to provide a terminal arranged to acquire data from a plurality of analog and digital sources, to communicate the acquired data to a remote computer for processing, and to accept responsive data from the remote computer, in a more efficient manner than systems known heretofore. In this regard, it is also an object to provide for the efficient manual entry of data into the computer along with the acquired data. Thus, it is an object to afford an operator or user the capability to control the acquisition of data while such data is being acquired using a simplified data acquisition oriented control panel, obviating the need for an understanding of the computer language, instructions, and operation.

It is a more detailed object of the invention to provide a terminal having a plurality of input and output channels, for use with a remote computer, the terminal being adapted to assign a unique address to each of the input and output channels and to append the channel address to the channel data. In accomplishing the foregoing, it is a further object to provide a terminal adapter at the computer site for communicating with the terminal, the terminal and terminal adapter arranged to communicate using compound digital words including both data and address. Accordingly, it is an object to efficiently route received data to a location indicated by the appended address.

Other objects and advantages will become apparent from the following detailed description when taken in conjunction with the accompanying drawings, in which:

FIG. 1 in a perspective view of the terminal showing the operator's control panel;

FIG. 2 is a similar view of the satellite unit;

FIGS. 3a and 3b when joined form a logic diagram of the terminal circuitry;

FIG. 4 is a logic diagram of the terminal adapter circuitry; and,

FIG. 5 is a logic diagram of the satellite unit circuitry.

While the invention will be described in connection with a preferred embodiment, it will be understood that there is no intent to limit it to that embodiment. On the contrary, the intent is to cover all alternatives, modifications and equivalents as may be included within the spirit and scope of the invention as defined by the appended claims.

Figure 1:
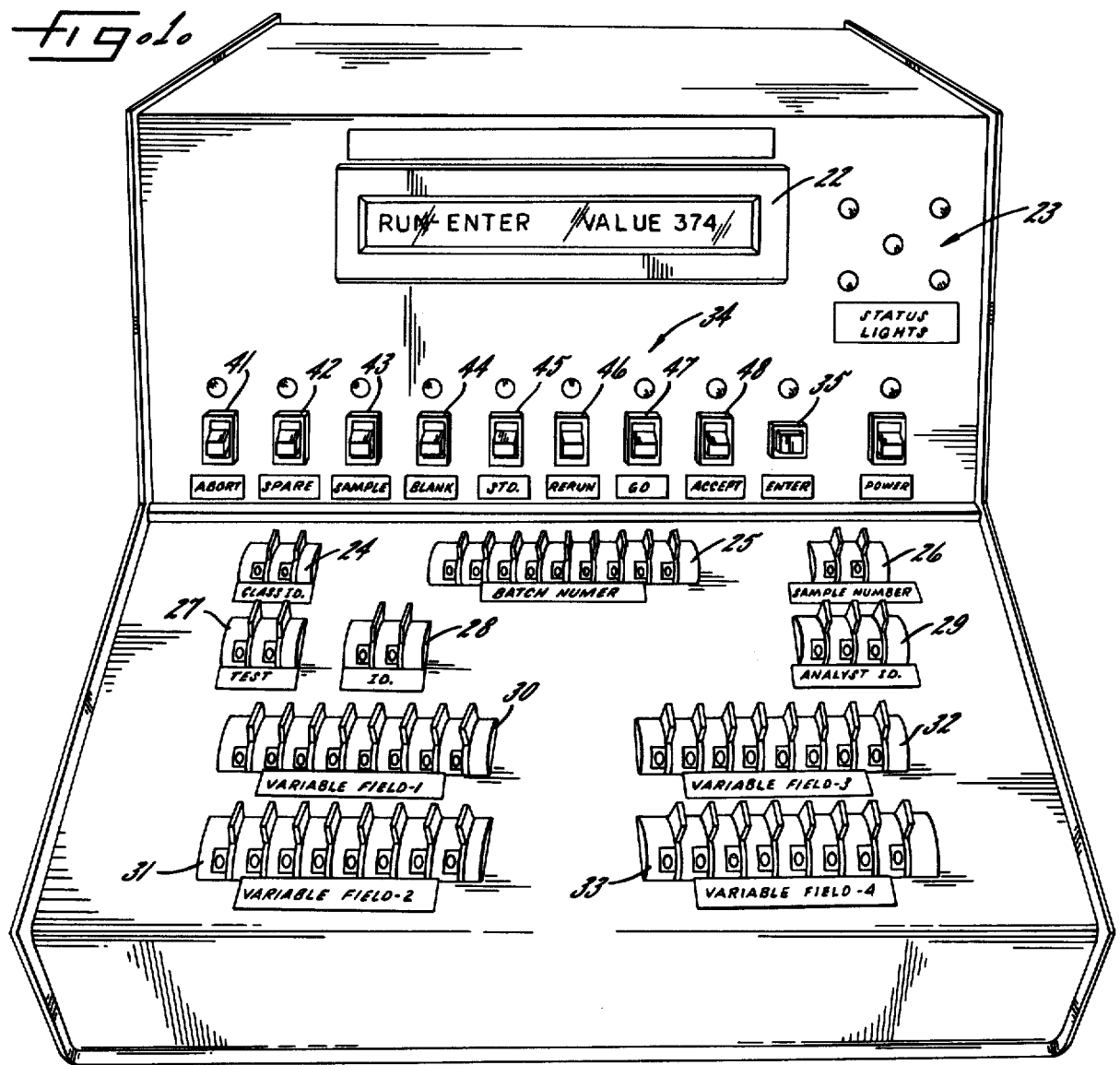

Turning now to the drawings, FIG. 1 illustrates the terminal unit itself, generally indicated at 21. The terminal 21, being entirely contained within a table mounted console including an operator's console, is arranged to be located in a laboratory, or other area where sensor produced data is to be collected. The unit is adapted to receive both analog and digital data, and to format such data for entry into a remote computer. Accordingly, the terminal rear panel (not shown) may be provided with a plurality of connectors, with one connector dedicated to each data input channel. As will be set forth in more detail below, the terminal includes an analog multiplexer operating in conjunction with an analog-to-digital converter, as well as a digital multiplexer. Thus, the input channels may be sequentially scanned, temporary storage being provided for holding the scanned data before transmission to the computer site. Additionally, each input channel is assigned a unique source address, and means are provided for storing the address along with the acquired data to indicate the source of such data.

For allowing the manual entry of data, the terminal is provided with a plurality of switches arranged in fields such as fields 24, 25 and 26, the switch outputs being arranged to form digital words for computer processing and control. Certain of the switches, for example those within fields 24–33, may be of the digital type having 10 positions and providing a binary or BCD output. Additionally, the function switches within field 34 may be of the toggle switch type, each controlling an associated bit within a function switch register, and each having an associated indicator to display the condition of the function switch register. Thus, the operator is allowed to verify the function switch instruction before causing transmission. For manually inducing a transmission, an Enter pushbutton 35 is provided, a depression thereof causing a transmission of the digital words formed of all the manual switches, as well as those produced by the analog and digital input section. The terminal is also equipped with output means such as the display 22 for responding to messages originated by the computer.

For communicating with the terminal, a terminal adapter is provided at the computer site, being arranged to transfer data to a computer for processing, to receive data from the computer for transmission to the terminal, and to accomplish communication relatively independently of the computer. As will become apparent, this arrangement provides increased processing efficiency, as a minimum amount of computer time is required to supervise and accomplish data transmission. Accordingly, a maximum amount of computer time may be dedicated to data processing, while still providing the user with flexible control over the computer.

A typical application for the sensor based computer terminal is one wherein it is desired to collect data from a plurality of sensors distributed at a collection station, to process that data at a computing station, and to return responses to the collection station in accordance with the processing. As noted above, the data sources may be instruments having analog outputs, as well as instruments having digital outputs, the remote computer being programmed to process the acquired data in accordance with the specific application or applications. The terminal provides means for informing the computer of the nature of the data to be provided, as well as instructing the computer as to which subroutine to use in processing the data.

In a typical application, it may be desired to weigh a plurality of units using an electrobalance having an analog output indicating the weight placed thereon, and to process the acquired data (the weights) according to a predetermined program. Initially, a link is established between the terminal and terminal adapter, causing the units to exchange end of transmission (EOT) messages, indicating that neither unit has data to send. Before commencing the acquisition of data, the operator must identify himself as well as the experiment to be run. Accordingly, the operator adjusts the digital lever switches in fields 24, 25 and 26 to indicate the class of test to be performed, and the batch number and sample number of the units to be tested. Additionally, the operator specifies a particular test by setting the digital lever switches within fields 27, 28 to indicate a test identification number. Finally, the operator enters his own identification number via the digital lever switches in field 29. Further preliminary information may be entered via the lever switches in fields 30 through 33. For example, the nominal weight of the units to be measured may be entered in field 30, while the number of samples to be measured may be entered in field 31.

After all of the preliminary identification and test parameter definitions have been set up as described above, the operator may cause such information to be transmitted to the computer for verification. In the illustrated embodiment, this action may be initiated by setting up the proper control word in function switch field 34, such as by momentarily actuating the Accept switch 48, followed by a momentary depression of the Enter button 35. In response, all terminal inputs are formed into digital words and transmitted to the terminal adapter for entry into the computer memory. The computer may be arranged to check the identification data for validity, and to set up the proper subroutines for the test to be run. If the computer is satisfied that the entered data is valid, it returns a signal to the terminal which causes the display 22 to display a message such as "VALID".

The operator may then calibrate the electrobalance, if desired, by placing a standard weight on the electrobalance, and entering the value of the standard weight within switch field 30. The Standard switch 45 and Accept switch 48 within function switch field 34 are momentarily operated, followed by a depression of Enter switch 35. This causes a transmission of data to the computer which adjusts a characteristic curve for the electrobalance, thereby calibrating the electrobalance output signal to the standard weight. When it is desired to analyze each of the units to be sampled, sampling is begun by actuating the Go switch 47, followed by a depression of the Enter switch 35. In response, an "IN PROCESS" message may be displayed on display 22. Additionally, each unit is weighed on the electrobalance, and the resulting data ultimately entered into the computer. It will be appreciated that the computer may respond to improper data by causing the display of a message, indicating an action for the operator. Additionally, the operator has control over the computer processing by utilizing the switches on the terminal itself. For example, a test may be terminated by momentarily activating the Abort switch 41, followed by a depression of the Enter pushbutton.

In accordance with an important aspect of the invention, means are provided for allowing additional operators access to the remote computer utilizing a single terminal. Initially, it should be noted that a second operator may enter his identification and test parameter data by appropriately using the switches on terminal 21 as described above. In addition, means, shown herein as satellite unit 51 (FIG. 2), may also be used to enter such information without utilizing the terminal control panel directly. Accordingly, a plurality of portable satellite units, each coupled to the terminal 21 by means of a cable 52, may be positioned at independent operating stations.

The satellite unit 51 includes a keyboard 54, a numeric display 55 and a message display 56. Accordingly, the required identification data may be assembled by sequentially depressing pushbuttons within field 54. Also provided is an Enter pushbutton 59 which operates in a manner similar to that noted with regard to the terminal. The numeric display 55 is adapted to verify the word which is assembled by sequential depression of pushbuttons within field 54, while the message display 56 is adapted to display computer responses.

Thus, in the exemplary application, if a second operator desires access to the computer using a second instrument, he may gain such access utilizing the satellite unit 51. It should be noted that the second instrument may be of the same type as that utilized by the first operator, or of a different type. Accordingly, the second operator may select any of the computer subroutines for processing his data, the terminal adapter and computer being adapted to route the proper data to the necessary subroutines. It is further apparent that a plurality of satellite controllers may be provided, allowing numerous operators to simultaneously and independently acquire data. For example, if a terminal is provided with eight analog inputs, eight satellite controllers may be provided.

Referring now to FIG. 3, a preferred embodiment of a terminal constructed in accordance with the invention, will be described. In order to clearly set forth the invention, the circuitry will be described in terms of a functional block/logic diagram. While each block may include a plurality of circuit elements, the means for implementing each block will be apparent to one skilled in the art, when given the functional description of the block as well as its input and output requirements.

To accept data from a plurality of input sources, the terminal 21 includes an input section generally indicated at 101. A plurality of analog input signals, illustrated as analog signal sources 102 and 103, are coupled to the input section 101, as well as a plurality of digital input signals illustrated by digital input sources 105 and 106. Each analog source has an associated amplifier, such as amplifiers 108 and 109, the amplifier outputs being coupled to analog multiplexer 110. The sequencing of the analog multiplexer 110 is controlled, in a known manner, by sequence control generally indicated at 111. The analog multiplexer output is coupled to a variable gain amplifier 112, whose output in turn is sampled by sample and hold circuit 114 for maintaining a stable signal at the input of analog to digital converter (ADC) 115 during the digitizing period. ADC 115 digitizes each analog sample, in sequence, yielding a sequence of parallel digital words representative of the values of the scanned signals. To provide increased resolution for signals having small magnitudes, amplifier 112 may be of the variable gain type controlled by autoranging logic 116. Such an arrangement provides for the automatic selection of a gain which will yield maximum resolution for each input signal. To allow the digitized signal to be interpreted when using the autoranging feature, a range code output element 118 is provided to include within the output digital word an indication of the gain of amplifier 112. It is seen that the outputs of the analog to digital converter 115 and the range code element 118 are coupled to input multiplexer 119.

To acquire data from a plurality of digital sources 105 and 106, a digital input section is provided including a digital multiplexer 120 controlled, in a known manner, by sequence control 111. It is seen that the output of the digital multiplexer 120 is also coupled to input signal multiplexer 119.

In view of the foregoing, it will be apparent that each of the analog and digital input signals may be scanned, with the output of multiplexer 119 indicating the digital value for each scanned input. The scanning may be controlled in a known manner by sequence control 111 which may also be arranged to respond to a terminal output signal for controlling the rate and order of sequencing. While only two digital and two analog channels are illustrated, it will be appreciated that any reasonable number may be accommodated. In one embodiment of the terminal, eight analog and eight digital channels are provided.

In accordance with an important aspect of the invention, means are provided for assigning a unique address to each of the input channels shown herein as a source address generator 121, which is sequenced in conjunction with the input section 101 by sequence control 111. Accordingly, it will be appreciated that as each parallel data output word appears on the output lines of multiplexer 119, the corresponding address appears on the output lines of source addressed generator 121.

According to another aspect of the invention, temporary storage means are provided for storing the acquired data, shown herein as first-in-first-out (FIFO) memory 122. It is seen that the FIFO memory 122 includes a section for storing the output data from multiplexer 119 as well as a corresponding section for storing the associated address outputs of source address generator 121. In one embodiment of the invention, the FIFO memory may store 64 words of data and address, thereby allowing the continuous acquisition of data from the analog and digital sources even when the terminal is not immediately capable of transmitting such data to the computer site. It should also be noted that the FIFO memory provides two supplementary outputs as illustrated, indicating that data is present in the FIFO (data present output) or that the FIFO is full (OFLO output). As will become apparent, these outputs are used in determining if a data transmission should be initiated.

An output multiplexer 124 is provided to select the various input sources in sequence, and to couple the data provided by such sources to transmission circuitry for transmission to the computer site. It is seen that the parallel output of FIFO memory 122 is coupled to the output multiplexer 124, thereby allowing the output multiplexer to select the input section 101 for transmission of the data produced thereby. It should be noted that as each data word is always coupled to its associated address, the input section 101 may be sequenced in order, or randomly.

In practicing the invention, means are provided to manually enter control signals and housekeeping data into the terminal for transmission to the computer site, indicated herein as input section 127 coupled to the output multiplexer 124. Such signals, as noted above, may be used to control computer subroutines, as well as to identify individual operators, instruments, etc.

The plurality of digital lever switches arranged within fields 24–33 (FIG. 1) are indicated in FIG. 3 by digital switch inputs 125. The switches are electrically grouped to provide data words of 8 or 16 bits, with each data word associated with a unique source address. In order to more efficiently use transmission time, such address may be coupled to the associated words at the terminal adapter in a manner to be described below. However, the output multiplexer sequencer 126 may also be adapted to assign the proper addresses in a manner similar to source address generator 121, such function being indicated by the dotted connection between the sequencer 126 and output multiplexer 124. It is apparent that the digital switches may be arranged in groups, with the corresponding group inputs coupled to the output multiplexer 124, or alternatively the digital switches may be submultiplexed utilizing a simplified switching matrix coupled to the output multiplexer.

The satellite units 51 (FIG. 2) are indicated by digital input 128, having their parallel output lines coupled to the output multiplexer 124. To interface the satellite unit described above to the output multiplexer, the satellite input 128 may include a serial to parallel register for accepting the serial transmission from the satellite unit. However, the satellite units may also be arranged as simple terminal extensions, having a plurality of digital lever switches, each being parallel coupled to satellite input 128, thereby eliminating the need for the serial to parallel register. It should be noted that the sequencer 126, just as in the case of the digital switch input 125, may be adapted to provide a unique source address to each of the satellite unit digital words, as well as to each of the other input digital words to be described below. Alternately, as noted, the source address may be assigned at the terminal adapter.

In describing the function keys in field 34, it was noted that each of such keys controlled a corresponding bit in an eight bit register, such register being indicated as digital input 129 in FIG. 3. Accordingly, the status of each bit within the register 129 is controlled by its associated function key, the status of the function keys thereby being transmitted to the computer site when the function key input 129 is scanned.

A further digital input, internally controlled, is read status register 130. Such register is adapted to monitor various internal conditions, much as the function keys monitor external conditions, and to transmit the status information when scanned. The status register 130 may be used, for example, to identify the occurrence which causes a transmission, having a bit dedicated to each of the terminal Enter pushbutton, the logical or of the satellite Enter pushbuttons, the teletype ready signal (indicating that a teletype character is ready for transmission) and the FIFO overflow signal.

If desired, a teletype device may be provided for use with the terminal. Initially, it should be noted that whereas many prior art data acquisition systems require a teletype unit for communicating with the computer, the teletype unit in the present device may be considered optional, because of the capabilities of the terminal utilizing the various function keys, digital switches, etc. The teletype may be useful, however, for writing new programs, or for providing output copy in a permanent form. The input section of the teletype, which may be a keyboard and a paper tape reader, is indicated as teletype input 131, including a serial to parallel converter for accepting the serial code produced by the teletype and providing an 8 bit parallel output signal for coupling to the output multiplexer 124. The teletype input 131 also provides a data ready output to indicate that a teletype character has been received and is ready for transmission.

For selecting individual ones of the various inputs, and coupling the selected input to the serializing means for transmission to the computer site, the output multiplexer 124 is sequenced by sequencer 126. More specifically, the sequencer produces the proper signals on the output multiplexer address lines to cause the signals provided by selected ones of the inputs to appear on the output multiplexer's parallel output lines. It is seen that the parallel output lines are coupled to an input output (I/O) register 132. As noted above, the sequencer 126 may, in addition to selecting individual ones of the digital output words for serialization and transmission, provide the associated source address for certain selected words.

For responding to signals received from the computer site, output means, generally indicated at 134, are provided. As will become apparent, the output means may be used for control purposes, and also for displaying messages to the operator.

The display function is implemented in the illustrated embodiment by the alpha-numeric display output 135 (for operating display 22 of FIG. 1) and indicator lights 136. The alpha-numeric display may be the "Self-Scan" type produced by the Burroughs Corporation, and may be adapted to display various operator prompting messages under the control of the remote computer. Additionally, test results may be displayed. The indicator lights 136 include those shown on the front panel of the terminal within field 23, as well as the indicators 56 on each of the satellite units. An optional output device, as noted above, is the teletype printer 138, including a parallel to serial converter and the necessary timing components for driving a teletype unit.

A form of internal control may be provided by sampling timing register 139. Such register is coupled to sequence control 111, thereby allowing the computer to set the time base at which the analog and digital inputs are scanned, as well as the order in which such inputs are scanned.

If desired, overall control may be achieved by utilizing digital output word 140. Data is written into the digital output word register 140 under the control of the computer, and is made available to drive external devices. The external device may for example, take the form of a plotter, or a control device responsive to the digital signal.

Finally, write status register 141 is provided to set up certain conditions within the terminal under the control of the remote computer. For example, the status register contains bits which determine the number of satellite units which will be scanned. Additionally, the register 141 contains a bit which induces a computer controlled transmission from the terminal to the terminal adapter. As will become apparent, this allows the computer to demand a scan of the terminal inputs, independently of any operator action.

It is seen that each of the output devices is supplied data from a main data bus driven by I/O register 132. The particular output device which may respond to the data, is controlled by address decoder 142, the address decoder, in turn, being controlled by the address bits within I/O register 132. Accordingly, when the terminal is in the output mode, a word is received within I/O register 132. The data bits are coupled to the data bus, and are thereby provided to each of the output devices. The address bits are decoded by the address decoder 142 and activate one of the output devices, such as the alpha-numeric display 135, to allow it to respond to the data on the data bus.

In practicing the invention, converter means are provided to accept parallel data from the output multiplexer 124, and to serialize such data for transmission to the computer site, as well as to accept the serial data from the computer site and to couple said data to the output means within the terminal. For controlling the transmission rate, an oscillator 144 is provided, having an output frequency which may be adjusted to suit the particular data transmission requirements. For example, when the system is operating into a dedicated pair of transmission lines, the oscillator 144 may operate at a relatively high frequency. The frequency may be correspondingly decreased when telephone lines are used, to accommodate the requirements of an appropriate data modum.

The signal from the oscillator 144 is coupled to timing counter 145 for controlling transmission and reception, the timing counter being adapted to count the oscillator pulses for synchronizing the data words. After timing counter 145 sequences through its entire range, thereby indicating the transmission of a complete word, a signal is provided to word counter 146 which increments the sequencing means 126. Thus, the output multiplexer 124 is sequenced to scan successive inputs, the sequencing occurring at the termination of transmission of the previous word. It is apparent, therefore, that the parallel signals sequentially provided to I/O register 132 for transmission are the combined data and address of each of the scanned inputs, the analog and digital inputs 101, as well as the manual inputs 127. For serializing the word within I/O register 132, a shift signal is provided by counter 145, the frequency being controlled by oscillator 144. It is seen therefore that the parallel data within I/O register 132 is serially shifted out, one bit at a time, and coupled to transmit driver 148 for driving the transmission line generally indicated at 149. It is noted that interposed between the I/O register and the transmit driver is a three bit line code generator 150. Such generator is an arrangement of gates which provide an identification signal at the start of each transmitted word.

It is also seen that a line receiver 151 is coupled to the transmission line 149 for receiving a signal from the terminal adapter. The output signal of receiver 151 is ultimately coupled to the serial input of I/O register 132. It is also noted that a gating network 152 is similarly placed to gating network 150 for detecting the three bit line code. It is apparent that the received data words are serially shifted into I/O register 132, for deserialization, and coupled in parallel fashion to the output devices as indicated above.

Gating network 154 is provided to operate in conjunction with the foregoing components to control transmission and reception, as well as to indicate and detect the start of a transmitted word. In the illustrated embodiment, the first three bits of a transmitted word are used to indicate whether data will be following, or alternately indicate the end of the transmission (EOT). Accordingly, a binary 110 sequence is used to indicate an end of transmission, while a binary 100 sequence is used to indicate that data will be immediately following. Assuming that a binary 110 (EOT) message has been received from the terminal adapter, such signal is coupled through line receiver 151, and detected by gating circuit 152. In response, gating circuit 154 disables the line receiver 151 and enables the line driver 148. If the terminal has no data to transmit, a signal is provided to three bit line code generator 150 to transmit a binary 110 sequence, indicating an end of transmission. However, if a data ready signal is received from any of the FIFO, TTY input, Enter, data present in FIFO, or status register inputs, the gating circuit 154 will cause the three bit line code generator 150 to produce a binary 100 sequence, indicating that data will be immediately following. It is seen that the timing counter 145 is coupled to the three bit line code generator 150 to allow the production of such message only during the first three bits of a transmitted word. Immediately after the production of the signal indicating data will follow, subsequent clock pulses are coupled through timing counter 145 to I/O register 132, thereby causing the data contained within such register to be shifted out to the transmission line. As noted above, as each word is shifted out, the word counter 146 increments the output multiplexer 124, thereby to transmit the data and associated address for each terminal input channel. After the last digital word is transmitted, the timing counter 145 couples a signal to three bit line code generator 150 causing it to produce a binary 110 sequence, or EOT message. Gating circuit 154 then disables line driver 145, and enables line receiver 151 in preparation for the reception of a message from the terminal adapter. If a 110 message is received, it is detected by three bit line code detector 152, again enabling the line driver and disabling the line receiver. However, if a 100 message is detected by three bit line code detector 152, the gating circuit 154 continues to allow the receiver 151 to be enabled, and also couples a reset signal to timing counter 145, thereby preparing the I/O register 132 to receive a serial message from the terminal adapter.

According to an important aspect of the invention, a terminal adapter is provided at the computer site for communicating with the terminal and arranged to maintain communication while using a minimum amount of computer time. The transmit/receive section of the terminal adapter illustrated in FIG. 4 is very similar to that of the terminal, and will be described only briefly. A master oscillator 170 is provided to control the transmission frequency, and acts through timing counter 171 to provide a shift signal to I/O register 172. A line driver 174 and line receiver 175 are coupled to the transmission line 149, and arranged to be alternately enabled by gating arrangement 176. Those elements, in conjunction with three bit line code generator 170 and three bit line code detector 178 operate in a manner similar to the transmit/receive portion of the terminal described above. It is noted, however, that the data ready signal for the terminal adapter is provided only from memory 180. In summary, the terminal and terminal adapter include internal line control circuitry to provide efficient half-duplex communication relatively independently of computer supervision.

Data received from the terminal is coupled through receiver 175 and serially shifted into I/O register 172. In response to the receipt of a full word, the data is coupled to buffer register 181. Similarly, the address portion of the received word is coupled through a source address buffer register 182 to a computer address buffer register 183. Also coupled to computer address buffer register 183 is block address buffer register 184 which may be provided in the event that multiple terminals and adapters are used with a single computer. The block address is arranged to select a particular starting memory location in the computer for data block transfer, and is addressable by the computer to set a particular starting location in accordance with a data output word as shown. Data transfer to the computer is then accomplished using direct memory access (DMA) techniques. However, as the address is always present with the data, standard I/O data transfer techniques may also be used.

It was noted above that, if desired, the source addresses for the input channels within manual input 127 may be coded with their source address at the terminal adapted. It is apparent that this is only possible if the manual inputs 127 are scanned in a predetermined sequence. In this event, the source address register 182 is arranged to be incremented by I/O register 172 after each word is received, thereby generating the source address for the received data. Even in this situation, however, the source address register 182 is also adapted to directly receive the transmitted address associated with the analog and digital input channels 101.

For coupling received data to the computer, the output of address buffer register 183 and data buffer register 181 are coupled to the address input lines and data input lines, respectively of the computer or CPU generally indicated at 185. It should be noted in this regard that various forms of computer may be used with the terminal and terminal adapter, the computer forming no part of the invention. The particular embodiment illustrated is adaptable for use with the Digital Equipment Corporation PDP-11 series of computers. However, it will be apparent to one skilled in the art that various forms of computers, including both mini-computers and those of the IBM 360 or 370 type may be utilized. In one embodiment of the invention, the data within buffer register 181 is loaded into computer memory in locations determined by the address with address buffer register 183. Accordingly, the data is immediately routed to dedicated locations where it is immediately available for processing. In an alternative embodiment, both address and data are loaded into sequential locations in computer memory. The computer must then test the address bits in order to select the proper data for processing. In either event, however, the address being intimately coupled to the data allows the individual data words to be processed by the proper computer subroutines.

The illustrated computer has independent address output lines and data output lines, such lines being coupled to a memory 180 for temporary storage before transmission to the terminal. It is seen that the memory provides a parallel output signal to the I/O register 172, as well as a data ready signal to the gating arrangement 176. Accordingly, when the terminal adapter receives an end of transmission signal from the terminal, if data is present in memory 180, the terminal adapter causes the serial transmission of said data to the terminal. It is further noted that the transmitted data includes both data for operating one of the output devices, as well as the address of the selected output device.

Figure 2:
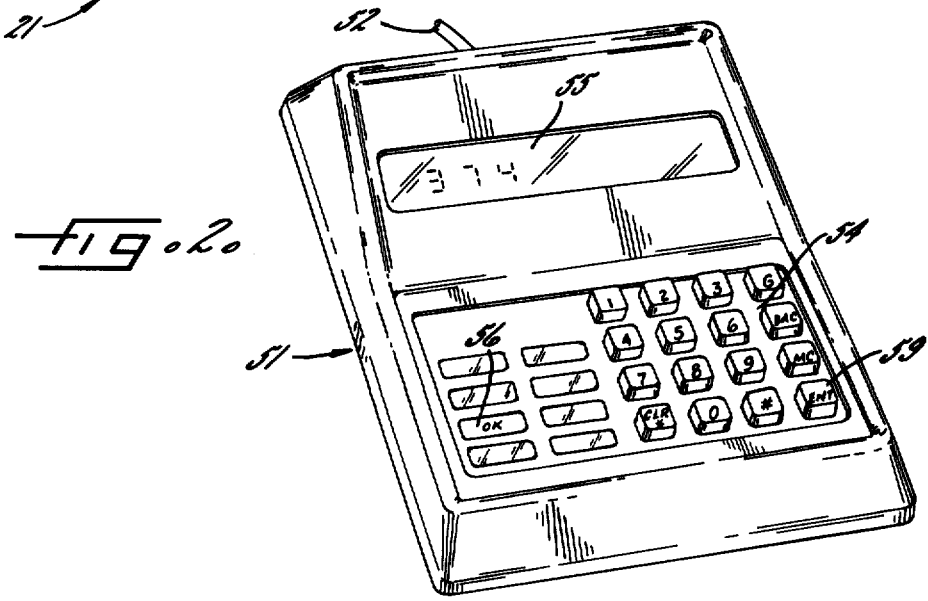

The remote satellite units, which were functionally described with reference to FIG. 2, will be described in greater detail with reference to FIG. 5. The keyboard 54 is adapted to provide a plurality of signals to keyboard encoder 201, one of such signals corresponding to each key. These signals are coupled through register 202 and stored in memory 204 for driving the numeric display 55. The memory 204 may include a decoder if necessary. Accordingly, as individual keys on the keyboard are depressed, the corresponding codes are loaded into memory 204 and displayed on display 55. As keys are depressed in sequence, the position within memory 204 is shifted such that the display 55 properly indicates the sequence of entries. The keyboard encoder 201 is also coupled to I/O register 205 for sending a signal corresponding to the depressed keys to the terminal. As noted above, the satellite unit input 128 on the terminal 21 includes a serial to parallel register for accepting such signals. Thus, depression of keys on keyboard 54 not only causes the display on display 55, but additionally loads the corresponding information into an associated register in the terminal. A Clear pushbutton is also provided to delete erroneous entries.

The I/O register 205 is also adapted to receive a serial signal from the terminal and cause a display in response thereto on status display 56. The status display 56 may for example indicate that the terminal is busy and cannot respond immediately to a signal from the satellite, or that a message is waiting at the terminal for the satellite. The dashed connection between I/O register 205 and register 202 indicates that the adapter may be arranged, if desired, to display computer induced messages on numeric display 55. Also included are busy-/ready status lines for inhibiting communication between the terminal and satellite unit in the event either unit is busy.

It should be noted that, while the invention has been described in connection with exemplary peripheral output devices (e.g. the teletype unit), it is easily adaptable to other peripheral devices (e.g. a CRT display) not specifically described.

In view of the foregoing, it is apparent that what has been provided is a sensor based computer terminal including both a terminal unit and a terminal adapter unit which provide the capability of high speed data acquisition utilizing a remote computer. Each acquired data word, whether it be acquired from a sensing source, or from a manual input source, is associated with a unique digital address. The address may be loaded along with the associated data into the computer memory, or the address may be stripped from the data at the terminal adapter, and the data loaded into computer locations in accordance with the source address. In either case, the transmission and reception of data are accomplished independently of the computer. Data may be entered into the computer from the adapter in a DMA fashion without requiring the computer to supervise deserialization, or any other line control functions. Accordingly, a maximum amount of computer time is dedicated to data processing.

I claim as my invention:

1. In a data acquisition system having a plurality of data sources at a collection station, a processor at a processing station, and transmission means coupling said stations, the combination comprising, input means at the collection station coupled to the data sources for receiving input data, means for assigning a source address to each data source, scanning means coupled to the input means for selecting individual ones of the data sources and forming an input digital word including the source address and the input data received by the selected source, means for serializing the input digital words and coupling the serialized words to the transmission means, means at the processing station coupled to the transmission means for receiving and deserializing the serialized words, means for loading the deserialized words including the data and source address into the processor, whereby data collected at the collection station is efficiently identified and transferred to the processor, output means at the collection station for responding to output data, said output means having at least one output channel, means for assigning a destination address to each output channel, means at the processing station for receiving output data and the address of a selected output channel from the processor, means for forming an output digital word including the output data and the destination address of the selected output channel, means for serializing the output digital word and coupling said serialized word to the transmission means, and means at the collection station for deserializing the serialized word and coupling the data within said word to the addressed output channel, whereby effective two-way communication is provided between the processing station and the collection station.

2. The combination as set forth in claim 1 wherein the input means includes an analog input section comprising a multi-channel analog multiplexer, a variable gain amplifier coupled to the multiplexer, an analog to digital converter coupled to the amplifier, means for selecting the amplifier gain, and means for including a digital indication of the amplifier gain within the digital input word, said assigning means being adapted to assign a source addressed to each channel of the analog multiplexer.

3. The combination as set forth in claim 2 wherein the input means further includes a digital input section comprising a multichannel digital multiplexer, said assigning means being adapted to assign a source addressed to each channel of the digital multiplexer.

4. The combination as set forth in claim 3 further including temporary storage means interposed between the analog and digital input sections and the serializing means for temporarily storing the input digital words including data and address prior to serializing thereof.

5. The combination as set forth in claim 4 wherein the input means further includes switch means for manual entry of input data.

6. The combination as set forth in claim 4 further including a plurality of portable satellite stations, each of said stations including means for manual entry of data and means for initiating a data transmission, whereby a plurality of operators may independently control the transmission of data.

7. In a data acquisition system including a local data site and a processor at a remote site, said local and remote sites being joined by a data transmission means, the combination comprising, a terminal at the local site, and a terminal adapter at the remote site, said terminal comprising multi-channel input means for acquiring input data, output means having at least one channel for responding to output data, means for assigning a unique address to each of said channels, scanning means for selectively scanning the input channels for receiving input data, means responsive to the input means for formating an input digital word for each scanned channel including the input data and the address of the scanned channel, means for serializing the formatted input digital words and coupling the serialized words to the transmission means for transmission to the terminal adapter, means coupled to the transmission means for receiving an output digital word from the terminal adapter and de-serializing said received word, the output digital word being formatted to include output data and the address of a selected output channel, and means responsive to the address within the output digital word for coupling the data contained within said word to the selected output channel, said terminal adapter including means coupled to the transmission means for receiving and de-serializing the input data words, means for coupling the de-serialized words to the processor, means for accepting the output digital words from the processor, and means for serializing the output digital words and coupling the serialized output words to the transmission means for transmission to the terminal, whereby the local and remote sites effectively cooperate in acquiring data and responding thereto.

8. The combination as set forth in claim 7 further including line control means for selectively enabling the terminal and the terminal adapter for transmission, said line control means including means for producing and transmitting an end of transmission signal, and means responsive to the reception of an end of transmission signal for initiating a transmission, whereby half-duplex communication is provided.

9. The combination as set forth in claim 8 wherein one or more of the input channels are adapted to acquire analog data, and one or more of the input channels are adapted to acquire digital data, said input means including means for multiplexing the acquired analog data, means for digitizing the multiplexed analog data, and means for multiplexing the acquired digital data, whereby data may be acquired from a plurality of analog and digital sources.

10. The combination as set forth in claim 9 further including temporary storage means coupled to the analog digitizing means and the digital multiplexing means, thereby to provide the terminal the capability of simultaneously acquiring data while receiving a transmission from the terminal adapter.

11. The combination as set forth in claim 9 wherein the terminal further includes a plurality of switches, means for coupling the switches to the formating means for forming status digital words indicating the status of said switches, the terminal adapter including means for coupling the status words to the processor thereby to provide the capability of manual entry of data.

12. The combination as set forth in claim 9 wherein the output means includes a visual display responsive to one of the unique addresses for receiving data from the terminal adapter whereby the processor may cause the display of processed data.

13. In a data acquisition system for collecting data from a plurality of analog and digital data sources at a local site, and for processing the collected data using a computer at a remote site, said sites being joined by a transmission means, the combination comprising, a multi-channel analog input section having respective ones of the analog channels coupled to the analog data sources, the analog input section including multiplexing and digitizing means for scanning the analog channels and producing digital words representative of the analog data coupled to the scanned channels, a multi-channel digital input section having respective ones of the digital channels coupled to the digital data sources, the digital input section including digital multiplexing means for scanning the digital channels and producing digital words representative of the digital data coupled to the scanned channels, means for assigning a unique source address to each of the analog and digital input channels, memory means coupled to the analog and digital input sections for storing the digital words produced by said input sections in conjunction with the source addresses of the channels receiving said data, switch means for manual entry of input data, means for formatting the switch input data into digital words and assigning a unique source address to each of said words, output means including a plurality of data registers each having a unique destination address, converter means coupled to the transmission means operable in a parallel to serial mode for receiving parallel digital words including the source addresses from the memory means and the switch formatting means and serially transmitting said words, the converter means operable in a serial to parallel mode for receiving serial data including selected destination addresses and coupling the data to the selected data registers, means for selectively enabling the converter means for operation in the serial to parallel and parallel to serial modes, and means at the remote site including a second converter means interposed between the transmission means and the computer for data communication with the computer and with the local site.

* * * * *